(12) United States Patent
Nonaka (10) Patent No.: US 7,738,025 B2
(45) Date of Patent: Jun. 15, 2010

(54) CAMERA WITH A DISPLAY CONTROL (75) Inventor: Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 1326 days.

(21) Appl. No.: 11/197,256

(22) Filed: Aug. 4, 2005

(65) Prior Publication Data

US 2005/0270369 A1 Dec. 8, 2005

Related U.S. Application Data

(63) Continuation of application No. PCT/JP2004/004798, filed on Apr. 1, 2004.

(30) Foreign Application Priority Data

Apr. 4, 2003 (JP) ............................. 2003-101648

(51) Int. Cl.
*H04N 5/222* (2006.01)
*G09G 3/36* (2006.01)

(52) U.S. Cl. ............. 348/333.13; 348/135; 348/333.01; 345/102; 345/103

(58) Field of Classification Search ................. 348/135, 348/333.01, 333.02, 333.03, 333.04, 333.05, 348/333.06, 333.07, 333.08, 333.09, 333.1, 348/333.11, 333.12, 333.13; 345/102, 103
See application file for complete search history.

(56) References Cited

U.S. PATENT DOCUMENTS 5,634,146 A 5/1997 Goo

| | | | | |
|---|---|---|---|---|
| 5,673,079 A * | 9/1997 | Satoh | ............. | 348/14.1 |
| 5,699,115 A * | 12/1997 | Hiraki et al. | ............. | 348/333.13 |
| 6,009,282 A * | 12/1999 | Ishiguro et al. | ............. | 396/164 |
| 6,057,909 A | 5/2000 | Yahav et al. | | |
| 6,404,145 B1* | 6/2002 | Saito | ............. | 315/307 |
| 6,556,179 B2* | 4/2003 | Iwane et al. | ............. | 345/87 |
| 6,647,126 B1* | 11/2003 | Wen | ............. | 382/100 |
| 6,677,936 B2* | 1/2004 | Jacobsen et al. | ............. | 345/211 |
| 2005/0237292 A1* | 10/2005 | Kim et al. | ............. | 345/102 |

FOREIGN PATENT DOCUMENTS

| CN | 1101723 A | 4/1995 |
|---|---|---|
| CN | 1194056 A | 9/1998 |
| JP | 2000-307904 | 11/2000 |
| JP | 2001-24912 | 1/2001 |
| JP | 2001-086382 | 3/2001 |

OTHER PUBLICATIONS

Chinese Office Action for Application No. 200480005767.8, issued Mar. 23, 2007 (2 cover pgs. and 3 pgs. of text) (with English Translation of text (13 pgs.)).

* cited by examiner

*Primary Examiner*—Lin Ye
*Assistant Examiner*—Temitope Adeyiga
(74) *Attorney, Agent, or Firm*—Straub & Pokotylo; John C. Pokotylo (57) ABSTRACT

A camera comprises a monitor which allows a composition of a subject to be confirmed, a backlight which illuminates at least one region on the monitor, an image pickup device and a distance measuring unit for detecting an image condition of the subject, and a backlight control unit which changes the region to be illuminated by the backlight, in accordance with a detection result from the image pickup device and the distance measuring unit.

21 Claims, 7 Drawing Sheets

FIG. 11

CAMERA WITH A DISPLAY CONTROL

CROSS-REFERENCE TO RELATED APPLICATIONS

This is a Continuation Application of PCT Application No. PCT/JP2004/004798, filed Apr. 1, 2004, which was published under PCT Article 21(2) in English.

This application is based upon and claims the benefit of priority from prior Japanese Patent Application No. 2003-101648, filed Apr. 4, 2003, the entire contents of which are incorporated herein by reference.

BACKGROUND OF THE INVENTION

1. Field of the Invention

This invention relates to a camera and, more particularly, to monitor display for confirmation of composition at photographing with a digital camera or control of what is called through-image display.

2. Description of the Related Art

When a composition of a subject is confirmed on a digital camera, through-image display can be employed besides an optical viewfinder using a lens. The through-image display is a technique of displaying a subject image made incident on a digital image pickup unit, on a monitor such as a liquid crystal display (LCD) or the like at a real time as it is. Movement of the subject can be observed at a real time on the monitor, similarly to the optical viewfinder. The through-image display is also called movie mode. At the through-image display, however, the image pickup unit and the monitor are in an operated state, and many currents are thereby consumed for a long time. For this reason, the battery life becomes shorter as more time is spent for framing at determination of the composition.

On the other hand, a camera user can execute photographing while watching through an optical viewfinder of the digital camera, similarly to a conventional film camera. At the through-image display, however, photographing can be executed in more natural attitude than an attitude of bringing a face close to an eyepiece of the camera. In addition, the user can raise the camera over the head or lower the camera position to execute photographing without watching through the optical viewfinder. For this reason, a general user tends to prefer photographing employing the through-image display to photographing using the optical viewfinder. Therefore, as a measure of preventing the battery life from being short, it is required not only to recommend the user to merely use the optical viewfinder, but also to restrict the power consumption in the through-picture mode.

In other words, power is required to drive a display system, an image pickup system, an image processing system and the like of the digital camera, unlike the film camera. A considerable amount of currents are spent in the digital camera. Thus, short battery life is a serious problem for the digital camera. For example, if the battery is dead at a place where a battery for replacement does not sell, photographing cannot be continued. In this case, good memories cannot be saved.

Moreover, if composition is to be determined by using not the optical viewfinder, but the monitor such as the LCD, power is spent by electronic circuits of an image pickup system, an image processing system and a display system until the user determines the composition. Thus, the battery life is further wasted.

To solve this problem, Jpn. Pat. Appln. KOKAI Publication No. 2001-86382 discloses a technique of reducing power consumption by reducing the number of pixels of the image pickup means used at the through-image display.

BRIEF SUMMARY OF THE INVENTION

A camera according to a first aspect of the present invention comprises a monitor which allows a composition of a subject to be confirmed, an illuminating unit which illuminates at least one region on the monitor, a subject condition detecting unit which detects an image condition of the subject, and a control unit which changes the region to be illuminated by the illuminating unit, in accordance with the image condition of the subject detected by the subject condition detecting unit.

A camera according to a second aspect of the present invention comprises a monitor which allows a composition of a subject to be confirmed, an illuminating unit which illuminates at least one region on the monitor, a subject condition detecting unit which detects a distance distribution of the subject, and a control unit which changes the region to be illuminated by the illuminating unit, in accordance with the distance distribution detected by the subject condition detecting unit.

A camera according to a third aspect of the present invention comprises a monitor which has a function of emitting light for each of pixels, and which allows a composition of a subject to be confirmed at photographing time, a subject condition detecting unit which detects an image condition of the subject, and a light-emission intensity controlling unit which controls a light-emission intensity for each of the pixels of the monitor, in accordance with the image condition of the subject detected by the subject condition detecting unit.

A camera according to a fourth aspect of the present invention comprises a monitor which has a function of emitting light for each of pixels, and which allows a composition of a subject to be confirmed at photographing time, a subject condition detecting unit which detects a distance distribution of the subject, and a light-emission intensity controlling unit which controls a light-emission intensity for each of the pixels of the monitor, in accordance with the distance distribution of the subject detected by the subject condition detecting unit.

A camera according to a fifth aspect of the present invention comprises a monitor which allows a composition of a subject to be confirmed, a calculating unit which calculates a rate of an area of the subject in the monitor, and a limiting unit which limits a region on the monitor where an image is displayed, in accordance with the rate of the area of the subject calculated by the calculating unit.

A camera according to a sixth aspect of the present invention comprises an image pickup unit for photographing an image of a subject, a monitor which allows a region photographed by the image pickup unit to be visually recognized, a compressing unit which compresses data of the image photographed by the image pickup unit, and a limiting unit which limits the region on the monitor where the image is displayed if a compression rate of the data compressed by the compressing unit is great.

A camera according to a seventh aspect of the present invention comprises a photographing lens, a distance measuring unit which measures distance at an angle of view of the photographing lens, a main subject detecting unit which detects a position of a main subject from a distance measuring result of the distance measuring unit, a monitor which displays an image obtained via the photographing lens, a selecting unit which selects a specific region in accordance with the position of the main subject existing in the image displayed by the monitor, an illuminating unit which has a plurality of light sources to illuminate at least one of regions on the monitor an illumination control unit which illuminates the specific region selected by the selecting unit by turning on the light source, of the plurality of light sources, which corresponds to the region selected by the selecting unit.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be explained below with reference to the accompanying drawings.

First Embodiment

Figure 1:
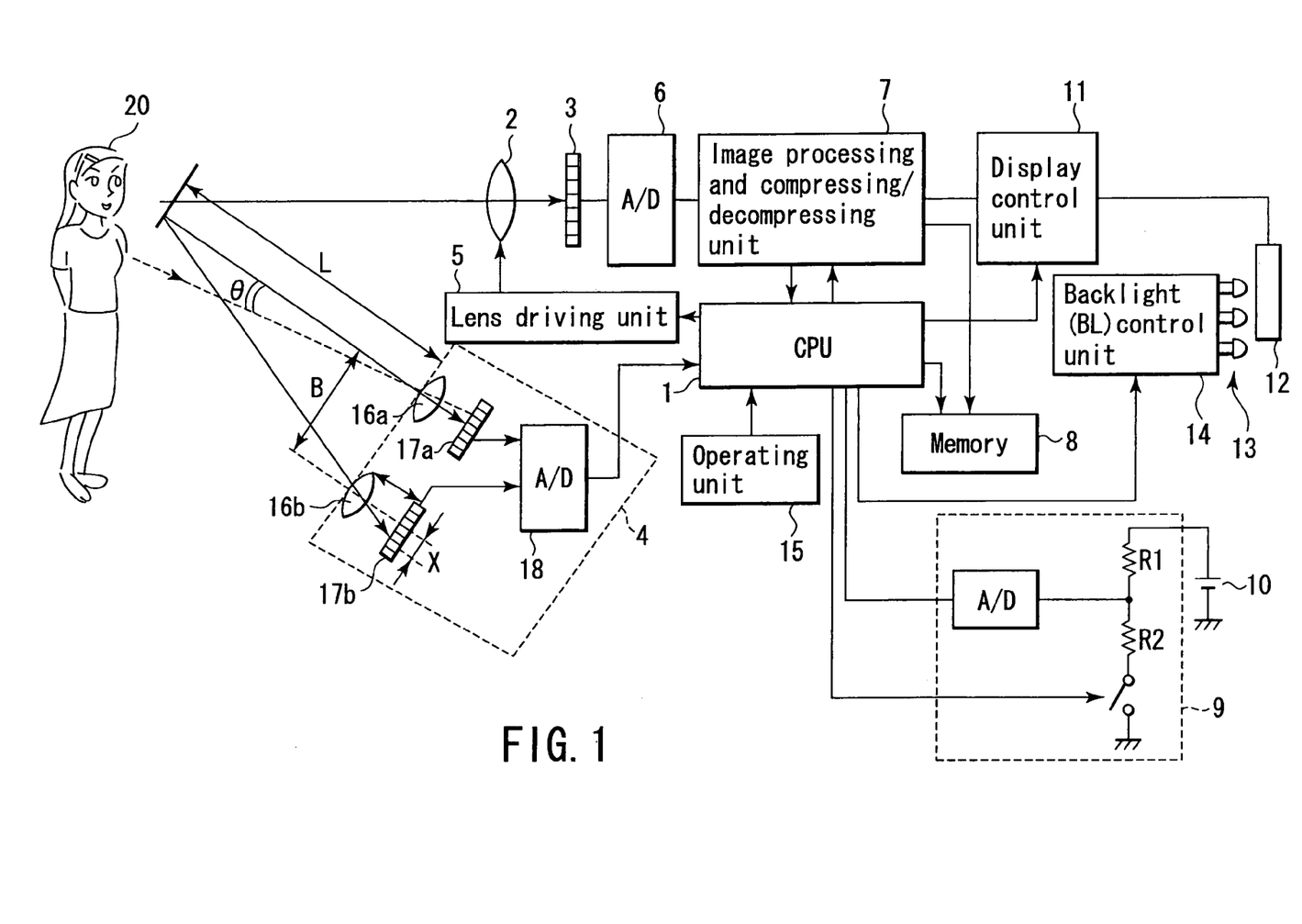
FIG. 1 is a block diagram showing a configuration of a camera according to a first embodiment of the present invention.

A configuration of a camera according to a first embodiment of the present invention is shown in a block diagram of FIG. 1. This camera comprises a CPU 1, a photographing optical system 2, an image pickup device 3, a distance measuring unit 4, a lens driving unit 5, an analog/digital (A/D) converter 6, an image processing and compressing/decompressing unit 7, a memory 8, a battery voltage measuring unit 9, a power supply battery 10, a display control unit 11, a monitor 12, a backlight 13, a backlight (BL) control unit 14, and an operating unit 15.

The CPU 1 is an operation control unit composed of a one-chip microcomputer or the like. The CPU 1 determines the conditions of the operating unit 15 operated by the user, and controls a series of photographing sequence, monitor display and a sequence of through-image display.

The photographing optical system 2 is composed of a plurality of lenses to make an image of a subject 20 incident on the image pickup device 3. At the photographing, the CPU 1 controls the lens driving unit 5 on the basis of a lens-to-subject distance obtained by distance measuring a photographing angle of view of the photographing optical system 2 by the distance measuring unit 4. The distance measuring unit 4 is composed of light-receiving lenses 16a, 16b, sensor arrays 17a, 17b, and an A/D converter 18.

In the distance measuring unit 4, light of the image of the subject 20 is received by the sensor arrays 17a, 17b through the light-receiving lenses 16a, 16b and a lens-to-subject distance L is obtained on the basis of a difference x between incident positions of the received light beams. The incident position difference x can be obtained by comparing, by the CPU 1, digital values obtained by causing the A/D converter 18 to digitize image signals output from the respective sensor arrays 17a, 17b. The respective distances between the light-receiving lenses 16a, 16b and the sensor arrays 17a, 17b are fixed. Thus, if the distance between the lenses is B and the lens-sensor distance is f, the lens-to-subject distance L can be obtained as:

$$L = B \cdot f / x$$

on the basis of the principle of triangulation. The CPU 1 controls the lens driving unit 5 and executes focusing of the photographing optical system 2, on the basis of the lens-to-subject distance L.

The image pickup device 3 is composed of, for example, a CCD sensor, a CMOS sensor or the like. The image pickup device 3 outputs an electric signal (image signal) depending on subject image brightness (image condition) to the A/D converter 6. The input image signal is converted into a digital value in the A/D converter 6. In the image processing and compressing/decompressing unit 7, the digital image signal is subjected to image processing such as γ conversion, color balance adjustment, edge enhancement and the like, and further subjected to data compression in a predetermined encoding format. The image data thus obtained is stored in the memory 8.

In addition, in FIG. 1, the CPU 1 measures a voltage of the power supply battery 10 by the battery voltage measuring unit 9. In other words, when the CPU 1 turns on a measurement start switch inside the battery voltage measuring unit 9, the voltage of the power supply battery 10 is divided by resisters R1 and R2. The divided voltage is read through an A/D converter located inside the battery voltage measuring unit 9 as a digital value. The battery voltage is thereby detected.

One of characteristics of the digital camera is that a photographed image can be confirmed quickly. For this purpose, the CPU 1 controls the display control unit 11 to display the photographed image on the monitor 12 composed of, for example, an LCD. At this time, the monitor 12 is illuminated by the backlight 13 composed of, for example, white light-emitting diodes (LED) or the like as the LCD does not have a light emitting function. In other words, the backlight 13 is formed by arranging a plurality of white LEDs (three LEDs in FIG. 1) on a back of the monitor 12. By emitting the light of the LEDs of the backlight 13 from the back of the monitor 12, the composition on the monitor 12 can be confirmed at a dark place. The white LEDs emit white light by the LEDs of three colors RGB.

The first embodiment is characterized by controlling turning on/off a plurality of LEDs of the backlight 13 separately. In other words, the backlight 13 can separately illuminate a plurality of regions on the monitor 12 under control of the BL control unit 14. Thus, if the LED corresponding to the region which does not need to be illuminated is turned off, power consumed for image display can be reduced.

Particularly, at the through-image display which allows the user to confirm and determines the composition of the subject 20 by starting up the monitor 20 during photographing, the user can check pose and facial expression of the subject while watching the image on the monitor 12. However, if the through-image display is employed for a long time, the battery goes dead soon as the backlight 13 consumes a large amount of power. For this reason, the CPU 1 determines which region needs to be illuminated and which region does not need to be illuminated, and controls the BL control unit 14 to switch turning on/off of each of the LEDs of the backlight 13 on the basis of the determination. In the first embodiment, a main subject is detected to detect the region which needs to be illuminated, on the monitor 12.

Figure 2:
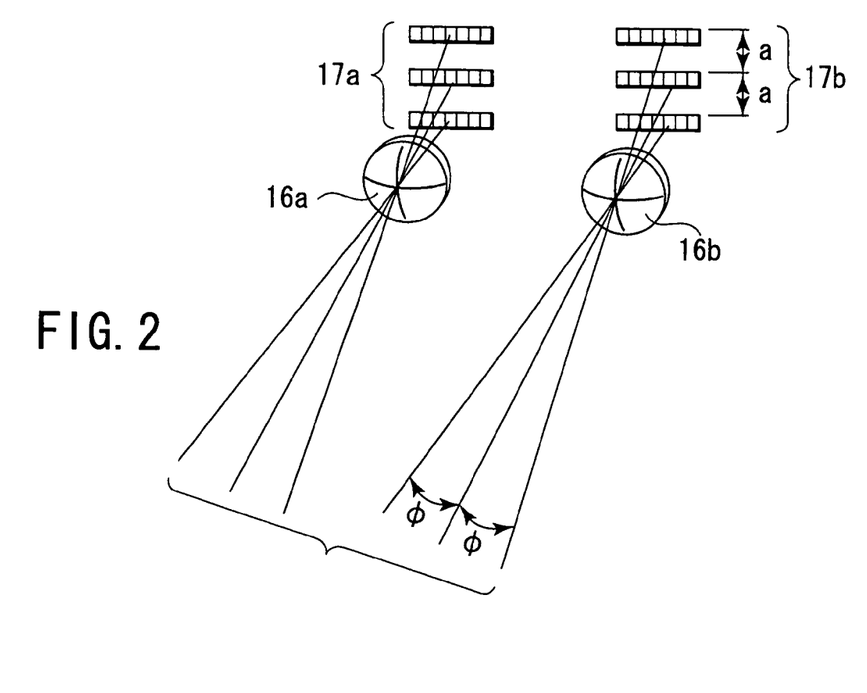
FIG. 2 is an illustration of a sensor array for distance measuring many regions.
Figure 3:
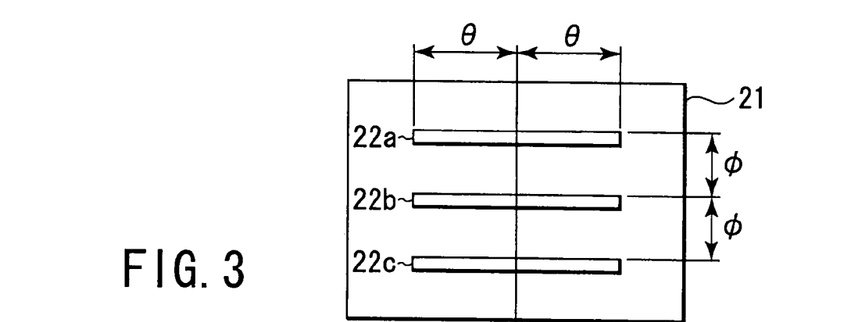
FIG. 3 is an illustration of a region which can be measured distance by the sensor array of FIG. 2.
Figure 4:
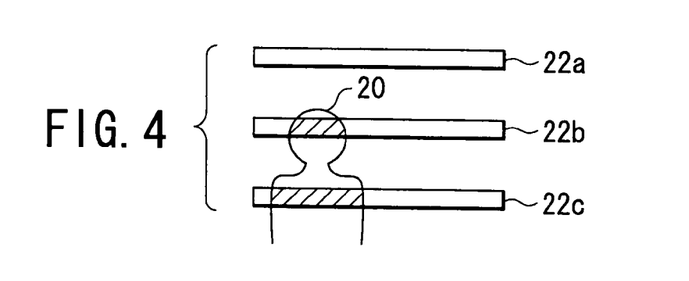
FIG. 4 is an illustration about a method of detecting a figure pattern.

A pair of sensor arrays are shown in FIG. 1 as distance measuring sensors employed in the distance measuring unit 4. As shown in FIG. 2, however, if a plurality of sets (three sets in FIG. 2) of sensors are spaced with a distance a in each of the sensor arrays 17a and 17b, the subject can be monitored at positions different in angle by $\phi$ in a lateral direction. In this case, ranges denoted by reference numerals 22a, 22b and 22c in a monitor screen 21 of FIG. 3 are regions in which the lens-to-subject distance can be detected. In FIG. 3, $\theta$ corresponds to $\theta$ of FIG. 1 and $\phi$ corresponds to $\phi$ of FIG. 2. In FIG. 4, for example, if a person 20 enters the regions in which the distance can be detected, as a main subject, the same distance measuring result is obtained at portions of oblique line. In other words, if distribution of the distance detected by the distance measuring unit 4 is analyzed and points having the same distance measuring result represent a personal shape, these points can be determined as the main subject. If the main subject thus determined can be sufficiently illuminated, the facial expression, attitude and the like of the person can be determined and the brightness of the backlight 13 on the other portion of the monitor screen may be slightly reduced.

Figure 5A:
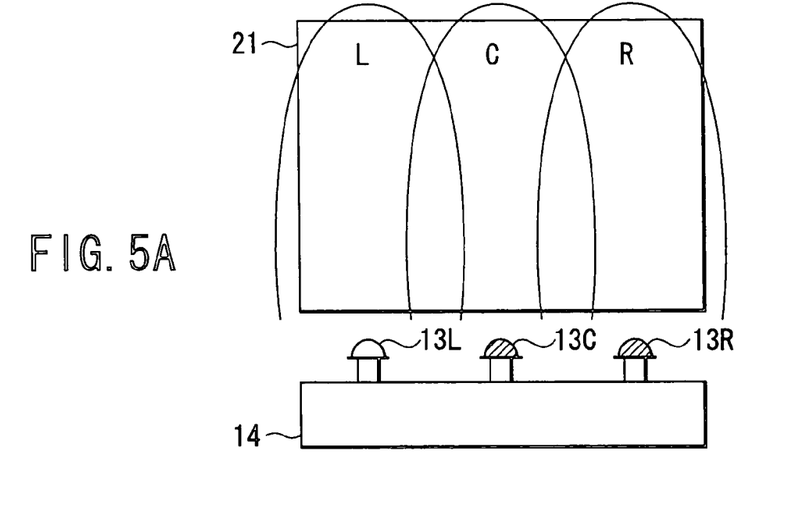
FIGS. 5A to 5C are illustrations about illumination of an LED for backlight.
Figure 5B:
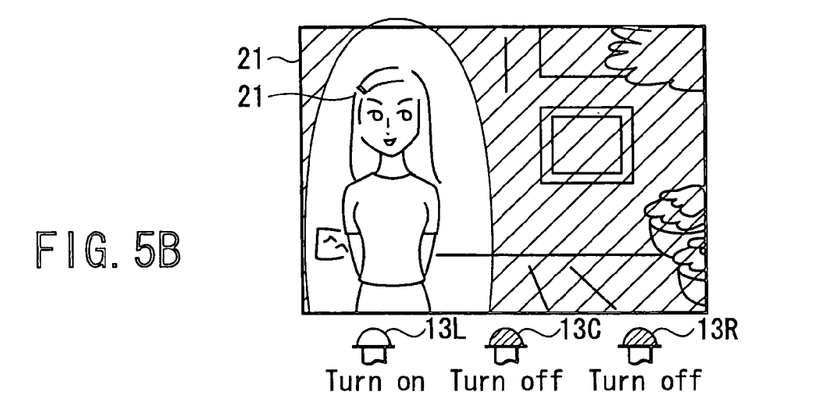
Figure 5C:
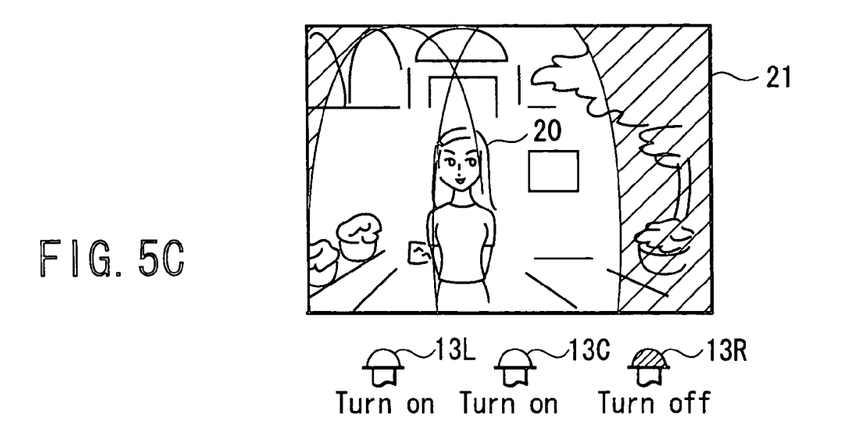

In the first embodiment, as described above, BL control unit 14 can selectively control turning on/off each of LEDs 13L, 13C and 13R of the backlight 13 shown in FIG. 5A. The LEDs 13L, 13C and 13R illuminate the respective portions of the monitor 12 by a light-guide panel (not shown). In other words, the LED corresponding to the region which is determined to need illumination is selectively turned on as shown in FIG. 5B to reduce the current consumption. In FIG. 5B, the main subject exists on the left side of the screen 21. Thus, the LED 13L is turned on to illuminate the main subject. If the LED 13C and the LED 13R are turned off, the user can understand that the main subject can be detected correctly. Incidentally, FIG. 5B show turning on/off as the control of the LEDs. However, the brightness of each of the LEDs may also be varied by increasing or reducing the amount of the current flowing to each of the LEDs. Power consumption can also be restricted even in this manner. Furthermore, if the main subject exists over two LED illumination regions, the two LEDs may be turned on and the remaining LED may be turned of to reduce the power consumption.

Figure 6:
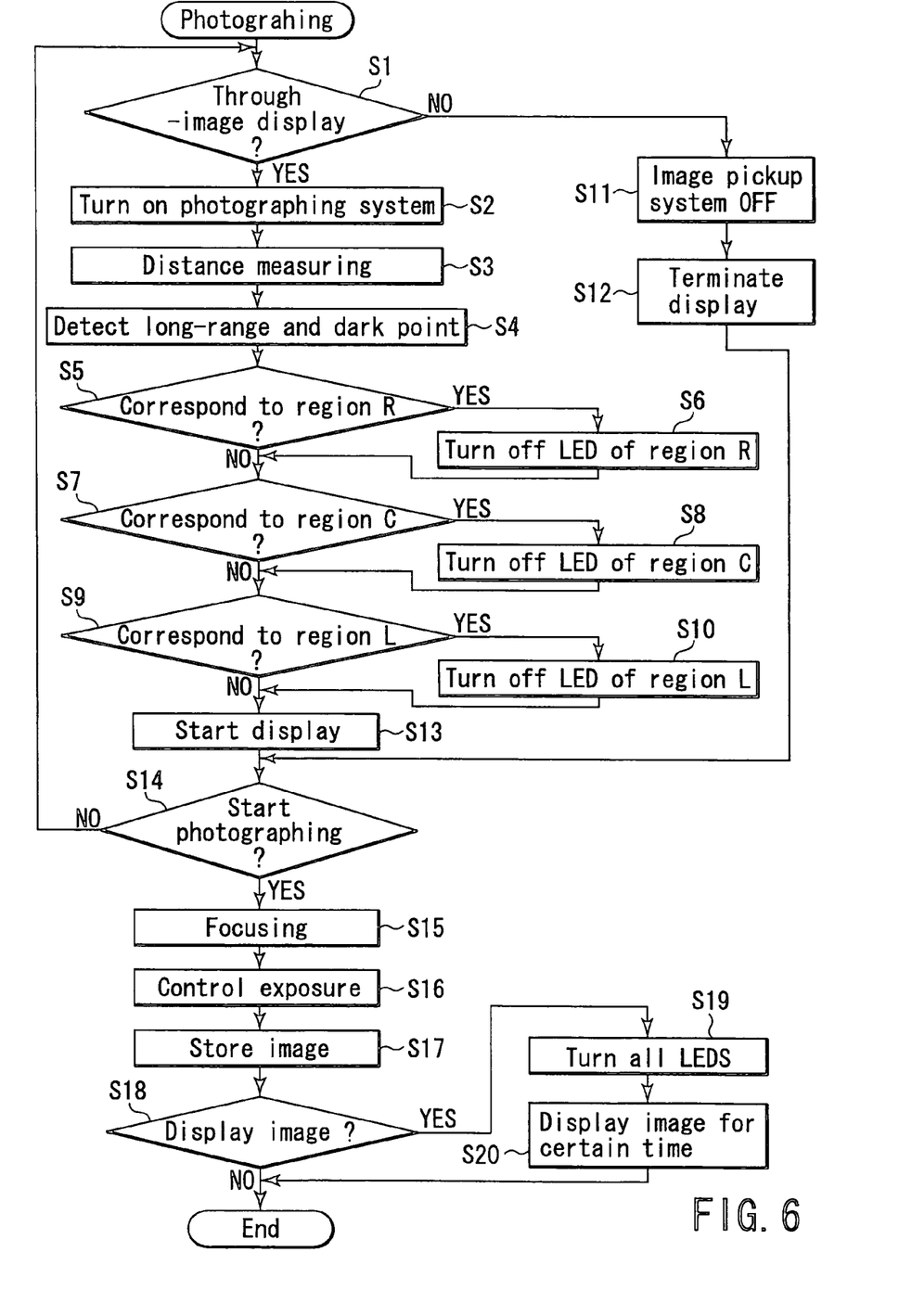
FIG. 6 is a flowchart of photographing control of the camera according to the first embodiment of the present invention.

Next, photographing controlled by the CPU 1 will be described with reference to a flowchart of FIG. 6. In FIG. 6, the CPU 1 first determines whether the through-image display should be executed on the basis of the operating conditions of the operating unit 15 (step S1). If the CPU 1 determines that operation control other than the through-image display should be executed, in step S1, the CPU 1 turns off the power supply of the circuit of the image pickup system including the image pickup device 3, image processing and compressing/decompressing unit 7, and the like (step S11) and terminates the display of the monitor 12 (step S12). Then the operation proceeds to step S14.

Figure 7:
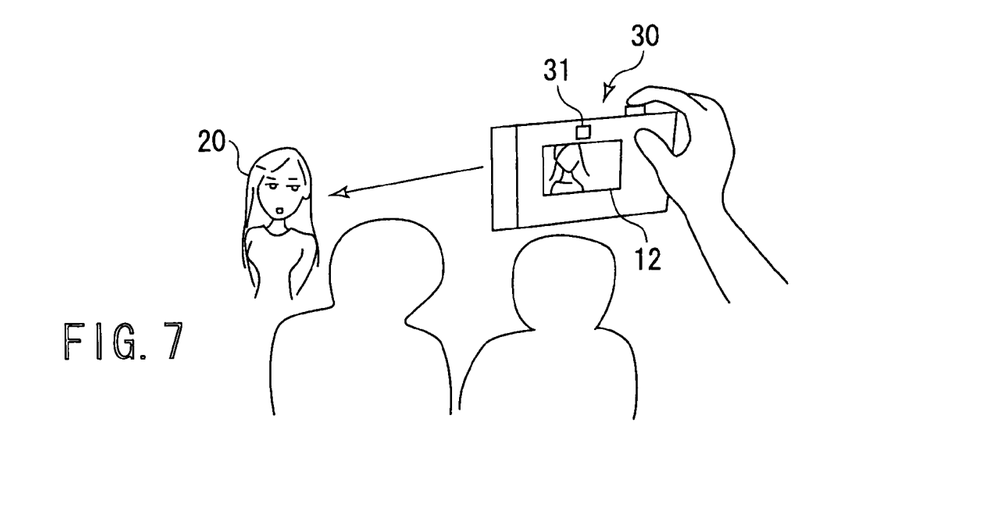
FIG. 7 is an illustration of photographing using the through-image display with a camera having an optical viewfinder.

For example, if the digital camera comprises an optical viewfinder and allows photographing using the optical viewfinder, similarly to a conventional film camera, the through-image display does not need to be executed. As shown in FIG. 7, however, if the user wishes to photograph the subject 20 beyond a crowd of people, the user displays a through-picture on the monitor 12 since the user cannot watch through the optical viewfinder 31 of the camera 30. At this time, the user sets the through-image display mode by the user operation.

If the CPU 1 determines this user operation, the operation proceeds to step S2. After that, the CPU 1 turns on the system of the photographing system to acquire an image to be displayed (step S2). The CPU 1 measures each point in the screen and obtains a distance distribution by the distance measuring unit 4 (step S3). The image signal has been obtained from the output of the image pickup device 3 in step S2. Thus, the CPU 1 detects a long-range and dark point on the basis of the obtained image signal (step S4). The long-range and dark point is considered to be the background. Such a point is originally dark. Even if the point is illuminated, it cannot be bright and the illumination wastes the power. Thus, the illumination is turned off or the illumination intensity is made smaller at this point. On the other hand, the illumination intensity is made greater at a close-range and bright point at which the main subject is considered to exist.

Next, it is determined at steps S5, S7 and S9 which of regions R, C and L in the screen corresponds to the point detected in step S4 and the LED of the region corresponding to the point determined as the long-range and dark point is turned off in step S6, S8 or S10. After that, the CPU 1 controls the display control unit 11 to start the image display (step S13).

In the above-explained manner, the through-image display can be executed while restricting the consumed power as much as possible. Thus, the battery life can be made longer and the user can concentrate on photographing without worrying about exchange of the batteries during travel or journey.

Next, the CPU 1 determines whether the user has operated the release button of the operating unit 15 (step S14). If the CPU 1 determines that the release button has not been operated in step S14, the operation returns to step S1. If the CPU 1 determines that the release button has been operated, the CPU 1 starts the photographing sequence. First, the CPU 1 adjusts the focus of the photographing optical system 2 to the distance to the main subject on the basis of the distance measuring result of the distance measuring unit 4 (step S15). The CPU 1 controls exposure (step S16) and stores the image signal obtained by processing the output from the image pickup device 3 in the memory 8 (step S17).

When the image is confirmed, the operating unit 15 is operated. The CPU 1 determines whether the operating unit 15 has been operated (step S18). If the CPU 1 determines that the operating unit 15 has been operated, the CPU 1 turns on all of the LEDs of the backlight 13 (step S19) and allows the image to be displayed (step S20). The image is displayed for a certain time since long-time display increases power consumption. Such control is executed by the CPU 1. After the control has been finished, the CPU 1 terminates the control of the flowchart in FIG. 6.

According to the first embodiment, as described above, the region in which the main subject does not exist and which is dark in displaying is not illuminated by the backlight. Therefore unnecessary power consumption can be restricted and the through-image display can be executed for a long time. Here, in the first embodiment, the main subject is detected by using the sensor arrays. However, the main subject may be detected by using a contrast AF.

Second Embodiment

Next, a second embodiment of the present invention will be explained. The second embodiment does not only determine the brightness and darkness and detect the distance, but also positively determines a person by using plural sets of sensor arrays described above.

Recently, display illuminated by not the backlight, but a new display device, on the monitor, has been proposed. In other words, a device allowing the pixels to have a light-emitting function has been developed. By using this device, brightness and darkness can be controlled at each pixel, without turning on/off the LED in each region. For example, if use of this device is assumed, only the person of the main subject can be illuminated while making the other portions dark, and power consumption on the display can be reduced further efficiently.

Figure 8A:
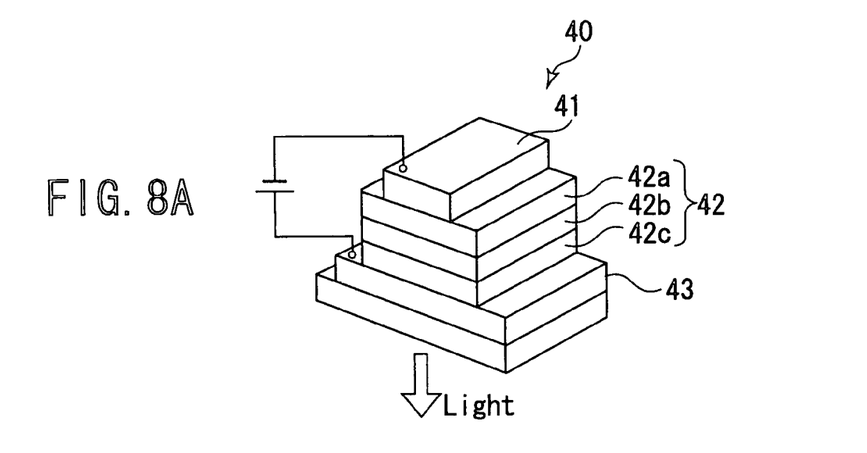
FIG. 8A is a perspective view of an organic EL device.

FIG. 8A shows a perspective view of an organic electro luminescence (EL) device as a typical device which allows each of the pixels to have a light-emitting function. An organic EL device 40 is formed by stacking an organic EL film 42 on a glass substrate. The organic EL device 40 has a sandwich structure in which a light-emitting layer 42b is sandwiched between an electron transport layer 42a for guiding electrons from a cathode 41 and a hole transport layer 42c for guiding holes from an anode 43. By applying voltage to both electrodes of the organic EL device 40, electrons and holes are recombined inside the light-emitting layer 42b. Organic molecules are excited during the recombination. When the organic molecules are returned from the excited state to the ground state, light emission occurs in accordance with energy difference between the excited state and the ground state.

In this organic EL device, intensity of light emission can be controlled by applying different voltages to the respective pixels. In addition, brightness and darkness can also be controlled by changing the period to pass the current to each of the pixels.

Figure 8B:
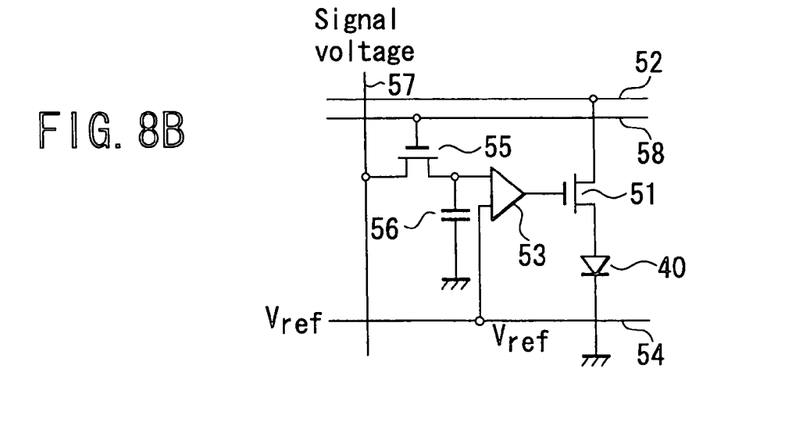
FIG. 8B is a circuit diagram of a light emitting circuit of the organic EL device.

FIG. 8B shows a light-emitting circuit for controlling light emission of the organic EL device 40. A drain of a transistor 51 is connected to the organic EL device 40. A source of the transistor 51 is connected to a wiring trace 52 and a gate thereof is connected to an output terminal of a comparator 53. In other words, a gate voltage of the transistor 51 is controlled by the comparator 53. One of input terminals of the comparator 53 is connected to a wiring trace 54 fixed to a reference voltage Vref and the other input terminal thereof is connected to a drain of a sampling thin film transistor (TFT) 55. A capacitor 56 is also connected to the drain of the sampling TFT 55.

A source of the sampling TFT 55 is connected to a wiring trace 57 for supplying a signal voltage and a gate thereof is connected to a wiring trace 58. In other words, the signal voltage is supplied to the sampling TFT 55 via the wiring trace 57, and voltage of the capacitor 56 held by the output voltage of the sampling TFT 55 is compared with the reference voltage Vref. The signal voltage is set to be lower for a pixel which is to be made brighter. If a sawtooth waveform is input to the reference voltage Vref, the transistor 51 is turned on during a time passing until the output of the comparator 53 is reversed. At this time, current flows to the organic EL device 40 such that the organic EL device 40 emits light. In other words, in the pixel which is made dark, the current flows to the organic EL device 40 during a short time since the time passing until the output of the comparator 53 is reversed is short. In the pixel which is made bright, the current flows to the organic EL device 40 during a long time. Thus, brightness and darkness can be controlled in accordance with the current supply time.

The light-emitting circuit for the organic EL device has a function of executing gradation display by setting a plurality of reference voltages corresponding to the brightness for each of the pixels. The structure of the second embodiment is the same as that of the first embodiment shown in FIG. 1, except employing the organic EL device for the monitor 12. The other elements are denoted by like or similar reference numbers and are not described in detail here.

Figure 9:
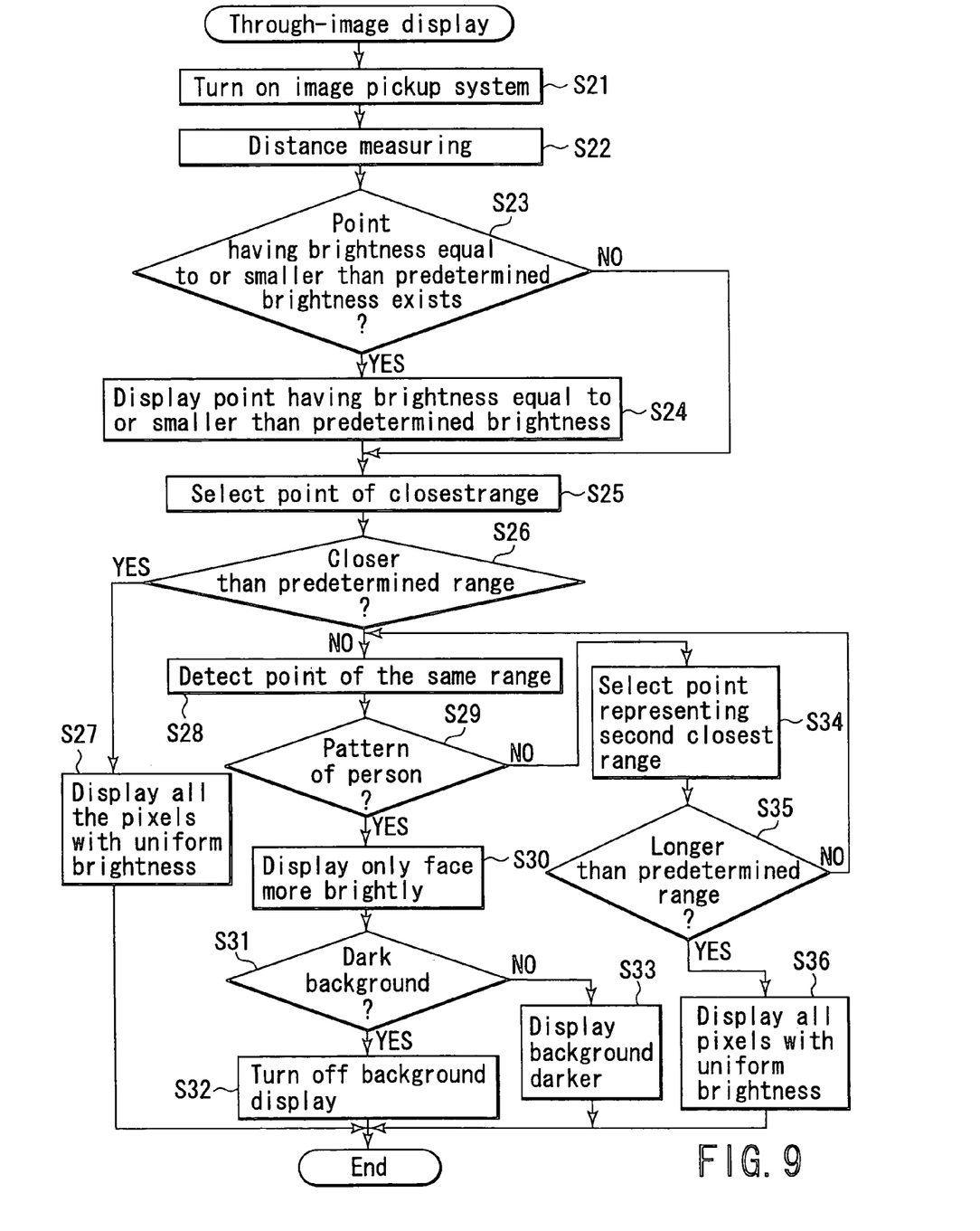
FIG. 9 is a flowchart of through-image display control of a camera according to a second embodiment of the present invention.

FIG. 9 is a flowchart of steps of controlling the through-image display in a case where the organic EL device is employed for the monitor. First, the CPU 1 turns on the photographing system (step S21) and starts distance measuring by the distance measuring unit 4 (step S22). These processings are the same as those of steps S2 and S3 in FIG. 6.

Following steps S23 and S24 are executed by assuming flash photographing and have not been considered in the first embodiment. In other words, the CPU 1 determines whether a point at which the image signal obtained by the image pickup device 3 is equal to or smaller than predetermined brightness (BV) exists (step S23). If the CPU 1 determines in step S23 that the point at which the image signal is equal to or smaller than predetermined brightness exists, the CPU 1 determines that flash light does not reach this point and turns off the display of the pixel corresponding to the point having the brightness equal to or smaller than the predetermined brightness (step S24). These processings enhance the power-saving effect. Such a point having the brightness equal to or smaller than the predetermined brightness remains dark after photographing since the reflected light of the flash photographing does not return. It is therefore meaningless to display this point brightly.

On the other hand, the point (person or the like) to which the flash light returns, i.e. the point where the image signal exceeds the predetermined brightness is displayed to be bright to make its facial expression recognized easily. At this time, the CPU 1 selects the point representing the closest range, of the distance distribution obtained from the distance measuring result (step S25). The CPU 1 determines whether the range to the selected point is closer than the predetermined range (step S26). If the CPU 1 determines in step S26 that the range to the selected point is closer than the predetermined range, the CPU 1 allows all the pixels to be displayed with uniform brightness (step S27). This corresponds to what is called macro photography (close-up). In this case, the photographer wishes to observe a close-range object carefully. Thus, the entire screen is displayed brightly.

If the CPU 1 determines in step S26 that the range to the selected point exceeds the predetermined range, the CPU 1 determines that not the macro photography, but photographing a person as the main subject is often executed and detects a point representing the closest range and a point representing substantially the same range (step S28). After that, the CPU 1 determines whether the detected points represent the pattern of the person 20 whose head and shoulders are detectable as shown in FIG. 4 (step S29).

If the CPU 1 determines in step S29 that the pattern of person has been detected, the CPU 1 urges the face to be displayed such that the brightness of the pixels at the point corresponding to the face is greater than the brightness of the other pixels since the facial expression is important (step S30). Next, the CPU 1 determines whether the background is darker than the predetermined brightness (step S31). If the CPU 1 determines that the background is darker than the predetermined brightness, the CPU 1 urges the illumination of the pixels corresponding to the background to be turned off (step S32). Even if the CPU 1 determines that the background is brighter than the predetermined brightness, the CPU 1 allows the image to be displayed while making the pixels of the background darker than the pixels of the person in order to reduce the power consumption for display (step S33).

If the CPU 1 determines in step S29 that the pattern of person could not be detected, the CPU 1 selects the second closest range (step S34) and determines whether this range is longer than the predetermined range (step S35). If the CPU 1 determines that the second closest range is closer than the predetermined range, the operation returns to step S28 in which the CPU 1 detects the portion of substantially the same range and determines again whether the detected portion is similar to the pattern of person.

On the other hand, if the CPU 1 determines in step S35 that the selected range is longer than the predetermined range, the CPU 1 determines that the pattern of person has not been detected in the approximately predetermined range and urges all the pixels to be displayed brightly similarly to the macro photography (step S36). In this case, the subject is landscape or the like and the specific portion is not considered as the main subject. Brightness of each pixel is set to be the same as general brightness that the user can normally see.

According to the second embodiment, as described above, it is determined whether the subject is in the close-up condition and whether the subject is a person or landscape, and illumination of each pixel of the monitor is controlled to correspond to the conditions of the subject. Therefore, power-saving effect can be enhanced.

Third Embodiment

Next, a third embodiment of the present invention will be explained. In the third embodiment, power consumption is reduced by not varying the quantity of light during the illumination, but limiting the display portion. This technique is based on an idea that if an area of illumination is limited the power consumption on the display can be reduced. The structure of the third embodiment is the same as that of the second embodiment.

In this case of illuminated display control, the display area may be limited by making the background darker as shown in FIG. 6. In this embodiment, however, the screen size is reduced in accordance with the compression rate at storage of the image data and the conditions of the subject and the power consumption is thereby reduced.

Figure 10A:
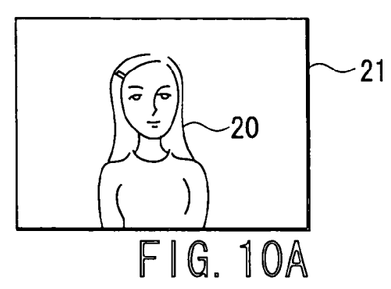
FIGS. 10A to 10C are illustrations about a concept of a camera according to a third embodiment of the present invention.
Figure 10B:
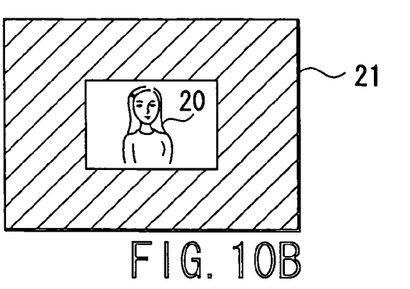
Figure 10C:
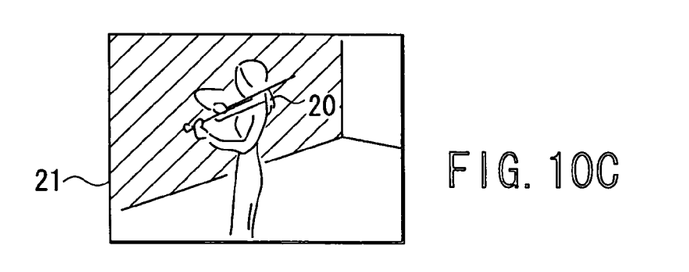

Specifically, the capacity of highly compressed image data is small. (For example, data is thinned in the JPEG compression.) Thus, an image of FIG. 10A is reduced as shown in FIG. 10B. However, if the range to the main subject is long and the rate (photographic magnification) of the main subject area to the screen is small as shown in FIG. 10C, the main subject cannot be seen when the image is reduced. Therefore, the image is reduced only when the lens-to-subject distance is short or the subject is displayed by telephotography and when the subject is displayed to be great as shown in FIG. 10A.

Figure 11:
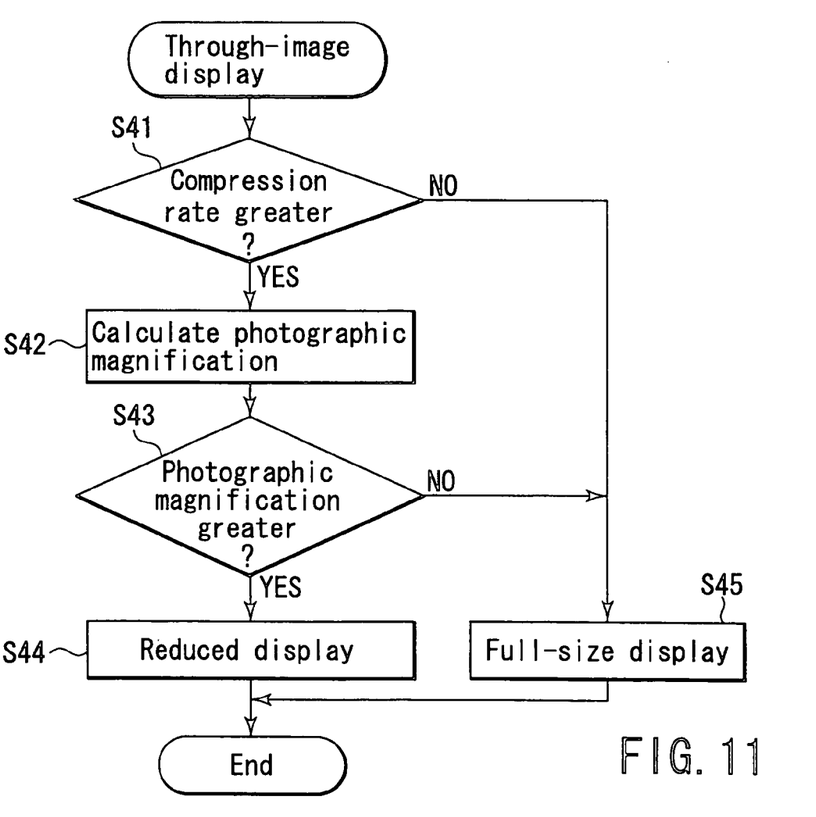
FIG. 11 is a flowchart of through-image display control of the camera according to the third embodiment of the present invention.

Next, control of the through-image display according to the third embodiment will be explained with reference to FIG. 11. First, the CPU 1 determines whether the compression rate is set to be greater than a predetermined value by user's operations or the like (step S41). If the CPU 1 determines that the compression rate is set to be greater than the predetermined value, the CPU 1 obtains photographic magnification $f_T/L$ from a distance measuring result (L) and a zoom position (focal distance $f_T$) (step S42). The CPU 1 determines whether the photographic magnification value is greater than a predetermined value (step S43).

If the CPU 1 determines in step S43 that the photographic magnification value is greater than the predetermined value, the CPU 1 limits the display region of the monitor 12 and allows the image to be reduced as shown in FIG. 10B (step S44). In this condition, the pixels of a diagonally shaded portion in FIG. 10B are not illuminated. Thus, the display power of the portion is unnecessary and the power consumption can be reduced considerably.

On the other hand, if the CPU 1 determines that the compression rate is equal to or smaller than the predetermined value or that the photographic magnification value is equal to or smaller than a predetermined value, the CPU 1 displays the image in a full size as shown in FIG. 10A or 10C (step S45) so that the user can easily see the image.

As described above, the third embodiment can provide a camera wherein the power for the display can be reduced and the battery life can be made longer by limiting the display screen of the through-image display unless required. In other words, the power required for illuminated display can be reduced by appropriately changing the effective region for display on the monitor.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera comprising:
   a monitor which allows a composition of a subject to be confirmed;
   an illuminating unit which illuminates at least one of a plurality of regions on the monitor;
   a subject condition detecting unit which detects an image condition of the subject; and
   a control unit which changes the one of the plurality of regions displaying the subject to be illuminated by the illuminating unit, in accordance with the image condition of the subject detected by the subject condition detecting unit,
   wherein the control unit detects a main subject in accordance with the image condition of the subject detected by the subject condition detecting unit and increases illumination intensity of the illuminating unit for illuminating the region where the main subject is detected.

2. The camera according to claim 1, wherein the control unit reduces the illumination intensity of the illuminating unit illuminating a region darker than a predetermined brightness.

3. The camera according to claim 1, wherein the subject condition detecting unit includes plural sets of sensor arrays for monitoring the region on the monitor and detects a main subject by detecting a pattern of person from an image signal whose image is formed on the plural sets of sensor arrays.

4. A camera comprising:
monitoring means for allowing a composition of a subject to be confirmed;
illuminating means for illuminating at least one of a plurality of regions on the monitoring means;
subject condition detecting means for detecting an image condition of the subject; and
control means for changing the one of the plurality of regions displaying the subject to be illuminated by the illuminating means, in accordance with the image condition of the subject detected by the subject condition detecting means,
wherein the control means detects a main subject in accordance with the image condition of the subject detected by the subject condition detecting means and increases illumination intensity of the illuminating means for illuminating the region where the main subject is detected.

5. A camera comprising:
a monitor which allows a composition of a subject to be confirmed;
an illuminating unit which illuminates at least one of a plurality of regions on the monitor;
a subject condition detecting unit which detects a distance distribution of the subject; and
a control unit which changes the one of the plurality regions displaying the subject to be illuminated by the illuminating unit, in accordance with the distance distribution detected by the subject condition detecting unit,
wherein the control unit detects a main subject in accordance with the distance distribution of the subject detected by the subject condition detecting unit and increases illumination intensity of the illuminating unit for illuminating the region where the main subject is detected.

6. The camera according to claim 5, wherein the control unit reduces the illumination intensity of the illuminating unit illuminating a region section darker than a predetermined brightness.

7. The camera according to claim 5, wherein the detecting unit includes plural sets of sensor arrays for monitoring the region on the monitor and detects a main subject by detecting a pattern of person from an image signal whose image is formed on the plural sets of sensor arrays.

8. A camera comprising:
monitoring means for allowing a composition of a subject to be confirmed;
illuminating means for illuminating at least one of a plurality of regions on the monitoring means;
subject condition detecting means for detecting a distance distribution of the subject; and
control means for changing the one of the plurality of regions displaying the subject to be illuminated by the illuminating means, in accordance with the distance distribution of the subject detected by the subject condition detecting means,
wherein the control means detects a main subject in accordance with the distance distribution of the subject detected by the subject condition detecting means and increases illumination intensity of the illuminating means for illuminating the region where the main subject is detected.

9. A camera comprising:
a monitor which has a function of emitting light for each of pixels, and which allows a composition of a subject to be confirmed at photographing time;
a subject condition detecting unit which detects an image condition of the subject; and
a light-emission intensity controlling unit which controls a light-emission intensity for a part of the each of the pixels of the subject on the monitor, in accordance with the image condition of the subject detected by the subject condition detecting unit,
wherein the light-emission intensity controlling unit detects a main subject in accordance with the image condition of the subject detected by the subject condition detecting unit and increases light-emission intensity of the light-emission intensity controlling unit for illuminating the region where the main subject is detected.

10. The camera according to claim 9, wherein the monitor includes an organic EL device.

11. A camera comprising:
monitoring means for having a function of omitting light for each of pixels, for allowing a composition of a subject to be confirmed at photographing time;
subject condition detecting means for detecting an image condition of the subject; and
light-emission intensity controlling means for controlling a light-emission intensity for a part of the each of the pixels of the subject on the monitoring means, in accordance with the image condition of the subject detected by the subject condition detecting means,
wherein the light-emission intensity controlling means detects a main subject in accordance with the image condition of the subject detected by the subject condition detecting means and increases light-emission intensity of the light-emission intensity controlling means for illuminating the region where the main subject is detected.

12. A camera comprising:
a monitor which has a function of emitting light for each of pixels, and which allows a composition of a subject to be confirmed at photographing time;
a subject condition detecting unit which detects a distance distribution of the subject; and
a light-emission intensity controlling unit which controls a light-emission intensity for a part of the each of the pixels of the subject on the monitor, in accordance with the distance distribution of the subject detected by the subject condition detecting unit,
wherein the light-emission intensity controlling unit detects a main subject in accordance with the distance distribution of the subject detected by the subject condition detecting unit and increases illumination intensity of the light-emission intensity controlling unit for illuminating the region where the main subject is detected.

13. The camera according to claim 12, wherein the monitor includes an organic EL device.

14. A camera comprising:
monitoring means for having a function of emitting light for each of pixels, and for allowing a composition of a subject to be confirmed at photographing time;
subject condition detecting means for detecting a distance distribution condition of the subject; and
light-emission intensity controlling means for controlling a light-emission intensity for a part of the each of the pixels of the subject on the monitoring means, in accordance with the distance distribution of the subject detected by the subject condition detecting means,
wherein the light-emission intensity controlling means detect a main subject in accordance with the distance distribution of the subject detected by the subject condition detecting means and increases light-emission intensity of the light-emission intensity controlling means for illuminating the region where the main subject is detected.

15. The camera of claim 1 further comprising:
a calculating unit which calculates a rate of an area of the subject in the monitor; and
a limiting unit which limits a region on the monitor where an image is displayed, in accordance with the rate of the area of the subject calculated by the calculating unit.

16. The camera of claim 4 further comprising:
a calculating means for calculating a rate of an area of the subject in the monitor means; and
a limiting means for limiting a region on the monitor means where an image is displayed, in accordance with the rate of the area of the subject calculated by the calculating means.

17. The camera of claim 1 further comprising:
an image pickup unit for photographing an image of a subject;
a compressing unit which compresses data of the image photographed by the image pickup unit; and
a limiting unit which limits the region on the monitor where the image is displayed if a compression rate of the data compressed by the compressing unit is great.

18. The camera of claim 4 further comprising:
an image pickup means for photographing an image of a subject;
a compressing means for compressing data of the image photographed by the image pickup means; and
a limiting means for limiting the region on the monitor means where the image is displayed if a compression rate of the data compressed by the compressing means is great.

19. A camera comprising:
a photographing lens;
a distance measuring unit which measures distance at an angle of view of the photographing lens;
a main subject detecting unit which detects a position of a main subject from a distance measuring result of the distance measuring unit;
a monitor which displays an image obtained via the photographing lens;
a selecting unit which selects a specific region in accordance with the position of the main subject existing in the image displayed by the monitor;
an illuminating unit which has a plurality of light sources to illuminate at least one of regions on the monitor
an illumination control unit which illuminates the specific region selected by the selecting unit by turning on the light source, of the plurality of light sources, which corresponds to the region selected by the selecting unit.

20. A camera comprising:
a photographing lens;
a distance measuring means for distance measuring at an angle of view of the photographing lens;
a main subject detecting means for detecting a position of a main subject from a distance measuring result of the distance measuring means;
a monitor means for displaying an image obtained via the photographing lens;
a selecting means for selecting a specific region in accordance with the position of the main subject existing in the image displayed by the monitor means;
an illuminating means having a plurality of light sources to illuminate at least one of regions on the monitor; and
an illumination control means for illuminating the specific region selected by the selecting means by turning on the light source, of the plurality of light sources, which corresponds to the region selected by the selecting means.

21. The camera according to claim 1, wherein the at least one region on the monitor illuminated by the illuminating unit has an area smaller than the whole displayable monitor area.

* * * * *